Dec. 31, 1929.   R. F. HUXMAN   1,741,172
GRASS CLIPPER
Filed May 26, 1927

Inventor
Richard F. Huxman
Daniel G. Brennan
Attorney

Patented Dec. 31, 1929

1,741,172

UNITED STATES PATENT OFFICE

RICHARD F. HUXMAN, OF BENTON HARBOR, MICHIGAN

GRASS CLIPPER

Application filed May 26, 1927. Serial No. 194,373.

My invention relates to improvements in grass clippers, and has for its object the provision of an improved construction of this character by means of which the grass on a lawn or the like may be readily trimmed or cut.

Another object of the invention is to provide a simple construction of the class mentioned by means of which the operator while walking in an upright position may readily trim or cut the grass of a lawn or the like.

Another object of the invention is to provide a construction of the class mentioned by means of which the trimming may be done with great accuracy and facility.

Another object of the invention is to provide a construction of the class mentioned made of simple and durable parts and capable of economical production.

Other objects will appear hereinafter.

In general the objects of the invention are attained by providing a vertically extending tubular handle member having a handle and co-operating lever at its upper end. The lever is connected with a connecting rod extending downwardly within the handle, the lower end of said connecting rod being connected with one arm of a bell crank mounted at the lower end of the handle member. The handle member carries at its lower end one fixed blade and one pivoted blade, the fixed blade being provided with a straight radial slot and the pivoted blade with an angular slot, one end of said bell crank operating in said slots to swing or reciprocate said pivoted blade. A suitable plunger and co-operating compression spring are imprisoned in the lower end of the handle member co-operating with one arm of said bell crank to perform the return stroke of said pivoted blade, the positive stroke thereof being caused by the lever at the upper end of the handle member.

The invention will be best understood by reference to the accompanying drawings forming a part of this specification and in which—

Figure 1:
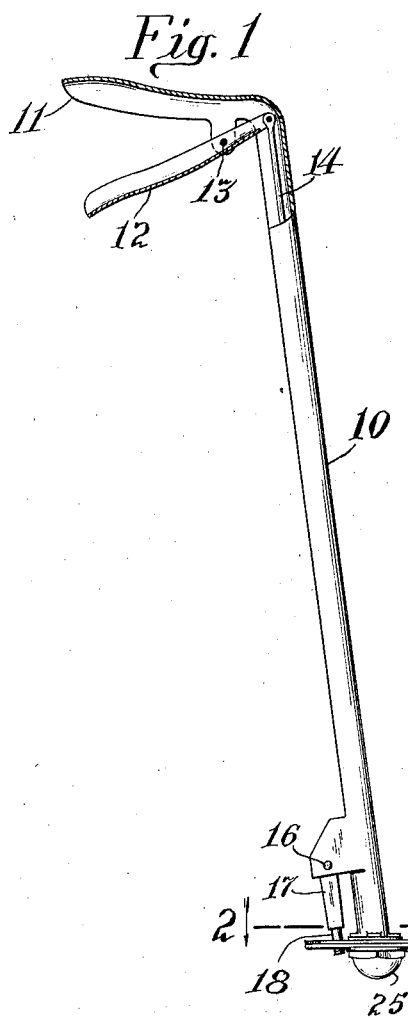
Figure 3:
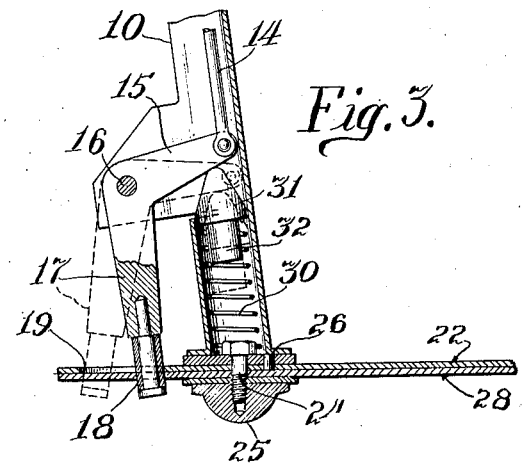
Figure 4:
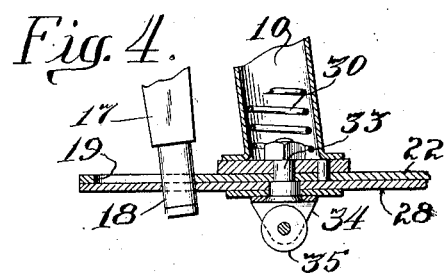
Figure 2:
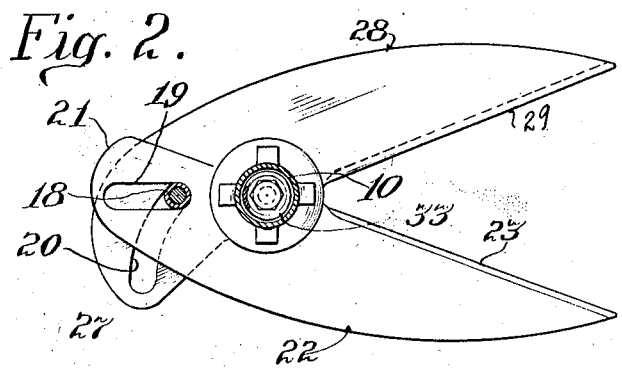

Fig. 1 is a side view, shown partially in section, of a lawn clipper or mower embodying the invention;

Fig. 2 a plan section taken substantially on line 2—2 of Fig. 1;

Fig. 3 an enlarged detail section taken through the lower end of the handle member; and Fig. 4 a similar view showing a slightly modified form of construction.

The preferred form of construction as illustrated in the drawings comprises a vertically extending tubular handle member 10, having a handle 11 formed at its upper end. A co-operating lever 12 is pivoted at 13 under the handle 11, said lever being connected with the upper end of a connecting rod 14 operating vertically in the handle member 10, as shown. The lower end of the connecting rod 14 is pivoted to one arm 15 of a bell crank lever which is pivoted at 16 in a rearward extension on the lower end of the handle member 10. The other arm 17 of said bell crank extends downwardly, as shown, and is provided with a friction sleeve or roller 18 operating in a straight radial slot 19 and in an angular slot 20 in two clipper or shear blades mounted on the lower end of the handle member 10. One of said shear blades 22 is fixed to the lower end of said handle member and provided with a rearwardly extending shank 21 which contains the straight radial slot 19, as shown. The blade 22 is provided with a cutting edge 23 and is held in place by means of a bolt 24 and a co-operating cap nut 25, as shown. The blade 22 is fixed against movement or rotation on the bolt 24 by means of a dowel pin 26 engaging an opening in said blade, as shown.

The angular slot 20 is formed in the rearwardly extending shank 27 of a blade 28 pivoted on the bolt 24 and having a shear edge 29 co-operating with the shear edge 23 of the blade 22.

By this arrangement it will be observed that by manipulating the handle 12 the blade 28 may be reciprocated or swung in shear fashion to co-operate with the stationary blade 22 and cut or clip the grass on a lawn or the like. By providing one stationary blade and one reciprocating blade, the stationary blade may be employed as a guide and thereby accurate clipping or trimming done and the side of a fence, wall, walk or the like, nicely followed and trimmed. The rounded bottom of the cap nut 25 will readily slide over the ground in the manipulation of the clipper.

A compression spring 30 is imprisoned in the lower end of the handle member 10 and co-operates with a conical plunger 31 having a shank 32 engaging said spring, as shown, the point or nose of the plunger 31 resting under the bell crank arm 15 and said spring thereby causing return or idle movements of the blade 28. This furnishes a simple and convenient construction and mounting of the spring for effecting return or idle movements of the blade 28.

In the modified form of construction illustrated in Fig. 4 a different form of bolt 33 is substituted for the bolt 24 and a bracket 34 secured to the underside of the device by said bolt. The bracket 34 carries a roller 35 which, it will be observed, will roll upon the ground or lawn being cut and thus alleviate friction and generally facilitate the manipulation of the device.

While I have illustrated and described the preferred forms of construction for carrying the invention into effect, these are capable of variations and modifications without departing from the spirit of the invention. I, therefore, do not wish to be limited to the precise details set forth but desire to avail myself of such variations and modifications as fall within the scope of the appended claims.

I claim:

1. A device of the class described comprising a vertically extending handle member; a blade fixed to the lower end of said handle member; a co-operating blade pivotally mounted to the lower end of said handle member, both of said blades being provided with shanks extending rearwardly beyond said handle, the shank of said fixed blade being provided with a radial slot, and the shank of said pivoted blade being provided with a straight co-operating slot at an angle to said radial slot; and means on said handle operating in said slots for reciprocating said pivoted blade.

2. A device of the class described comprising a vertically extending tubular handle member; a handle at the top of said handle member and a co-operating lever; a connecing rod connected with said lever and extending downwardly through said tubular handle member; a bell crank lever pivotally mounted in the lower end of said handle member, one arm of said bell crank being connected with said connecting rod; a blade fixed to the lower end of said handle member and provided with a shank having a radial slot, the other arm of said bell crank operating freely in said radial slot; a co-operating blade pivotally mounted on the lower end of said handle member and provided with a shank having a slot at an angle to said radial slot, said other arm of said bell crank also operating in said angular slot; and a plunger and co-operating compression spring in the lower end of said handle member and co-operating with said first mentioned arm of said bell crank.

3. A device of the class described comprising a vertically extending tubular handle member, a handle at the top of said handle member and a co-operating lever; a connecting rod connected with said lever and extending downwardly through said tubular member, ears formed in the lower end of said handle member, a bell crank lever pivotally mounted to said ears, one arm of said bell crank being connected with said connecting rod, a blade fixed to the lower end of said handle member and provided with a shank having a radial slot, the other arm of said bell crank having an anti-friction roller mounted thereon and operating freely in said radial slot; a co-operating blade pivotally mounted on the lower end of said handle member and provided with a shank having a slot at an angle to said radial slot, said other arm of said bell crank also operating in said angular slot; and a plunger and co-operating compression spring in the lower end of said handle member and co-operating with said first mentioned arm of said bell crank.

In testimony whereof I affix my signature at 10 South La Salle Street, Chicago, Illinois.

RICHARD F. HUXMAN.